(12) United States Patent
Hiernaux

(10) Patent No.: US 12,264,598 B2
(45) Date of Patent: Apr. 1, 2025

(54) SUB-ASSEMBLY FOR A LOW-PRESSURE COMPRESSOR OF AN AIRCRAFT TURBINE ENGINE

(71) Applicant: SAFRAN AERO BOOSTERS, Herstal (BE)

(72) Inventor: Stéphane Hiernaux, Herstal (BE)

(73) Assignee: SAFRAN AERO BOOSTERS, Herstal (BE)

(*) Notice: Subject to any disclaimer, the term of this patent is extended or adjusted under 35 U.S.C. 154(b) by 0 days.

(21) Appl. No.: 18/537,319

(22) Filed: Dec. 12, 2023

(65) Prior Publication Data

US 2024/0133304 A1 Apr. 25, 2024
US 2024/0229659 A9 Jul. 11, 2024

Related U.S. Application Data

(63) Continuation of application No. 17/999,261, filed as application No. PCT/EP2021/062437 on May 11, 2021, now Pat. No. 11,898,468.

(30) Foreign Application Priority Data

May 20, 2020 (BE) .................................. 2020/5357

(51) Int. Cl.
 *F01D 11/00* (2006.01)
 *F01D 9/04* (2006.01)
(52) U.S. Cl.
 CPC ...... *F01D 9/041* (2013.01); *F05D 2220/3217* (2013.01); *F05D 2220/323* (2013.01); *F05D 2240/12* (2013.01)

(58) Field of Classification Search
 CPC .... F04D 29/321; F04D 29/661; F04D 29/667; F04D 29/682; F04D 29/684; F04D 29/685; F01D 5/145; F01D 9/06; F01D 9/065; F01D 9/041; F01D 25/00; F05D 2260/60; F05D 2260/601
 See application file for complete search history.

(56) References Cited

U.S. PATENT DOCUMENTS 5,308,225 A * 5/1994 Koff .................. F01D 11/08
 415/58.7
6,514,039 B1 2/2003 Hand
 (Continued)

FOREIGN PATENT DOCUMENTS

EP 3 095 963 A1 11/2016
JP 07012098 A 1/1995

OTHER PUBLICATIONS

International Search Report mailed Jul. 5, 2021, issued in corresponding International Application No. PCT/EP2021/062437, filed May 11, 2021, 5 pages.
(Continued)

*Primary Examiner* — Steven M Sutherland
(74) *Attorney, Agent, or Firm* — CHRISTENSEN O'CONNOR JOHNSON KINDNESS PLLC

(57) ABSTRACT

A sub-assembly for a low-pressure compressor of an aircraft turbine engine includes a straightener provided with cantilevered vanes and a rotor hub having a cavity covered by an inner shroud opposite the vanes. Orifices are made in the inner shroud to allow an air flow to circulate in the downstream to upstream direction of the low-pressure compressor.

14 Claims, 4 Drawing Sheets

(56) References Cited

U.S. PATENT DOCUMENTS

| | | |
|---|---|---|
| 2005/0058541 A1 | 3/2005 | Le Biez et al. |
| 2009/0246007 A1 | 10/2009 | Johann |
| 2010/0034637 A1 | 2/2010 | Guemmer |
| 2015/0104298 A1* | 4/2015 | Allford ................ F04D 29/685 415/173.1 |
| 2017/0218976 A1 | 8/2017 | McGill et al. |
| 2020/0190991 A1 | 6/2020 | Propheter-Hinckley |

OTHER PUBLICATIONS

Written Opinion mailed Jul. 5, 2021, issued in corresponding International Application No. PCT/EP2021/062437, filed May 11, 2021, 6 pages.

International Preliminary Report on Patentability mailed Nov. 17, 2022, issued in corresponding International Application No. PCT/EP2021/062437, filed May 11, 2021, 7 pages.

* cited by examiner

SUB-ASSEMBLY FOR A LOW-PRESSURE COMPRESSOR OF AN AIRCRAFT TURBINE ENGINE

CROSS-REFERENCES TO RELATED APPLICATIONS

This patent application is continuation of U.S. patent application Ser. No. 17/999,261, filed Nov. 18, 2022, which is a National Stage entry of International Application No. PCT/EP2021/062437, filed May 11, 2021, which claims the benefit of Belgium Patent Application No. 2020/5357, filed May 20, 2020, the entire disclosures of which are hereby incorporated by reference in their entirety for all purposes.

FIELD OF THE DISCLOSURE

The present disclosure relates to a sub-assembly of low-pressure compressor for an aircraft turbine engine and to such a low-pressure compressor comprising this sub-assembly.

BACKGROUND

Typically, an aircraft turbine engine is equipped with two compressors, a low-pressure compressor and a high-pressure compressor, to suck and compress air to suitable velocity, pressure and temperature prior to conveying to a combustion chamber.

Each such compressor typically comprises a plurality of compressor stages aligned along an engine axis, directed from upstream towards downstream. Each stage consists of a movable member (rotor portion) extending along the engine axis and a stationary member (stator portion) referred to as "straightener." The movable and stationary members of the stages are thus alternated along the engine axis. Each member consists of a blading, i.e., an annulus of vanes arranged circumferentially around the engine axis. Technical parameters such as vane dimensions and geometry are determined so that the operating conditions of each stage are adapted to those of the upstream and/or downstream stages along the engine axis.

Low-pressure compressor straighteners are known to be equipped with overhang vanes, each attached by a root to an outer casing and extending substantially radially inwards towards the engine axis from its root. In this way, the head of the overhang vane, radially opposite its root, is free and opposite a hub of the rotor to which the movable members of the stages are coupled. This architecture of the straightener obviously requires a clearance between each vane head of the straightener (which is therefore stationary) and the hub of the rotor (which is therefore able to rotate on itself). When the turbine engine is in operation, this clearance generally induces in a generation and a circulation of a vortex of air referred to as "for leakage" from downstream towards upstream, i.e., in an orientation opposite to the main air flow circulating through the low-pressure compressor. These vortices are due to the fact that there is a pressure difference between the intrados and the extrados of the straightener, and between the trailing and leading edges of the vanes, as the pressure of the main air flow within the compressor increases from upstream to downstream.

These vortices cause losses in the compressor which impact its efficiency. It is therefore preferable to limit them.

A known solution to this problem is described in the document EP 3 095 963 A1 and consists essentially of adding an inner shroud to the straightener between the hub of the rotor and each vane head of the straightener, so as to reconstitute the inner aerodynamic duct of the compressor at the level of the straightener. In this case, the vane heads are no longer free. They are attached to this inner shroud in a sealing interface to prevent the formation of the leakage vortices. However, as the shroud itself has to be arranged between the rotor portion and the stator portion, there is still a need to maintain a clearance between these portions, this clearance in turn can lead to air leakage under the inner shroud, and thus losses in the compressor. To limit such leakage, as also disclosed in EP 3 095 963 A1, the inner shroud is equipped with a track of an abradable coating and the rotor hub is equipped with wipers, opposite this track. However, the integration of these additional elements implies an undesired increase in mass and consequently a reduction in efficiency of the low-pressure compressor. This increase in mass is further accentuated in the case of a variable pitch straightener, as each vane of the straightener must also be equipped with a pivot that insert into the inner shroud, which in this case generally consists of two portions that must be joined together.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is an object of the disclosure to provide a low-pressure compressor sub-assembly for an aircraft turbine engine comprising a straightener equipped with overhang vanes, so that the low-pressure compressor is more efficient.

To this end, the present disclosure proposes a sub-assembly of low-pressure compressor for an aircraft turbine engine extending along an engine axis directed from upstream towards downstream,
  the sub-assembly comprising:
  a rotor comprising a hub extending axially and circumferentially around the engine axis;
  a stator comprising a straightener equipped with (overhang) vanes extending substantially radially towards the hub;
  characterized in that:
  the hub comprises an inner recess directed towards the engine axis;
  the rotor comprises an inner shroud:
  covering the inner recess so as to define a cavity between the hub and the inner shroud,
  each of the vanes comprising a free head at least partially facing the inner shroud and/or the cavity;
  comprising orifices in fluidic communication with the cavity.

The low-pressure compressor sub-assembly according to the present disclosure allows to reduce the negative impact of leakage vortices that may occur between the vane heads and the rotor, without negatively impacting the mass of the low-pressure compressor. In particular, it allows a better efficiency of the low-pressure compressor to be achieved without the disadvantages of the solutions known in the prior art.

Indeed, rather than adding additional elements to the stator to limit the aforementioned leakage vortices, the low-pressure compressor sub-assembly according to the present disclosure proposes to treat the rotor hub, preferably in a non-axisymmetrical manner, opposite (directly) the vanes of the straightener, by creating therein inner recesses bordered by an additional inner shroud pierced by orifices, without modifying the stator portion in any way. In particular, each vane remains a free head (and therefore remains overhang), unlike the solution set out in the document EP 3 095 963 A1. Only the rotor portion is changed. The cavity and orifices passively allow a circulation of an air flow at the level of the straightener independently of the main air flow in the low-pressure compressor. In this way, any leakage vortices that may form can circulate downstream towards upstream through the cavity via the orifices, as the cavity provides more space than the minimum clearance usually left between the vane heads and the hub. Advantageously, the position of the orifices can be chosen to bring the air flow of these leakage vortices from downstream towards upstream to a desired position at the level of the straightener, and even upstream of it. In this way, it is possible to influence the flowing of the air flow to limit the leakage vortices at the level of the clearance between the stator and the rotor and, at the same time, limit the negative impact of these leakage vortices on the efficiency of the low-pressure compressor. This advantage is also achieved without changing the architecture of the vanes, which is interesting because this architecture has advantages in terms of mass, aerodynamic efficiency and design simplicity. Finally, it should be emphasized that the disclosure does not penalize the efficiency of the low-pressure compressor by increasing its mass. The low-pressure compressor sub-assembly (hereinafter referred to simply as the "sub-assembly") according to the disclosure therefore advantageously allows a better efficiency of the low-pressure compressor without negatively impacting its mass.

As the disclosure is based on the fact that the cavity allows a flowing of air flow that was initially between the rotor and the stator, it is highly preferred that the clearance between the inner shroud and the vane heads is minimal, to avoid too much parallel flowing of these leakage vortices between the vane heads and the inner shroud. In addition, the presence of the cavity makes it preferable to rebuild the inner aerodynamic duct of the rotor as cleanly and evenly as possible so as not to impact the compressor aerodynamically. Therefore, for both reasons, the inner shroud is preferably an extension of an outer surface of the hub so that an inner aerodynamic duct of the rotor is (re)formed in a regular manner. The initial clearance between the hub and the vane heads preferably corresponds to the clearance between the inner shroud (and/or the hub) and the vane heads. This preferred embodiment meets aerodynamic requirements within the low-pressure compressor.

For the sake of completeness, some of the above-mentioned concepts, which are well known to a person skilled in the art, are recalled in this document. A "hub" is a central portion of a conical and/or annular and/or disc-shaped rotating mechanical part. In the case of a low-pressure compressor, the hub of the rotor is a central conical part in that it extends along and around the engine axis. The use of a hub coupled to the movable bladings of the compressor is typical of the low-pressure compressor, with "discs" usually substituting the hub in the high-pressure compressor. Preferably, a movable blading of the rotor belonging to the same low-pressure compressor stage as the straightener in question comprises movable vanes with a root attached to the hub. The term "overhang vane" is also well known to a person skilled in the art. The term "overhang" is defined as being held above the void, without immediate support from below. In the case of the straightener vanes, this is a radial extension from the outside towards the inside of the vanes, with the head of each vane being held ("in a vacuum") opposite (directly) the hub of the rotor (and/or the inner shroud and/or the cavity, in the case of this disclosure), at the level of the inside of the low-pressure compressor. In this case, the vane roots are preferably attached to an outer casing of the low-pressure compressor. Thus, each vane comprises a "root" attached outwards, a "free head" inwards (i.e., not attached), an upstream "leading edge" to engage the main air flow circulating through the low-pressure compressor, and a downstream "trailing edge." Preferably, the vanes in question are circumferentially aligned and have a similar profile. Finally, it should be noted that the reference to a "straightener equipped with vanes" does not necessarily limit the vanes considered in this statement (and in the following by the references to "each of the vanes" or "the vanes") to all the vanes of the straightener. A selection of straightener vanes is therefore within the scope of these statements. However, preferably all the vanes of the straightener are considered by the latter.

For the purposes of this document, it is also recalled that a "recess" is a form of hollow and/or material removal, in this case in the hub. It is preferably created by a treatment of the hub and preferably extends axially and circumferentially. It is preferably not axisymmetric with respect to the engine axis. A "cavity" is an empty space within a solid body, in this case in the rotor portion under consideration. This cavity is preferably bordered by the inner shroud and the hub, or more precisely, by the inner shroud and an outer surface of the hub bordering the recess. Finally, it is recalled that the term "orifice" refers to an opening that makes communicate in a fluidic manner a cavity with the outside, in this case preferably with an outer space separating the vane heads and the inner shroud. In particular, an orifice is a hole opening on either side of the inner shroud. These definitions are widely known to a person skilled in the art and are only specified for the sake of completeness. In the case of the disclosure, each of the orifices passes through the inner shroud. The fact that the orifices are precisely in fluidic communication with the cavity created by the recess and bordered by the inner shroud allows a flow of air (in particular, leakage vortices) to pass through the orifices to circulate into the cavity, relieving the outer space (which corresponds to a clearance between the stator and the rotor) of a significant portion of this air flow. The words "comprising orifices" in this text are understood to mean "comprising at least two orifices", so as to allow for the capture and an injection of this air flow. The disclosure is by no means limited to the presence of a single cavity and/or a single recess. In particular, the rotor may comprise a plurality of such recesses, cavities and orifices, independently or not.

According to one embodiment of the disclosure, the inner recess is formed by at least one deformation of a wall of the hub. The wall is preferably formed from a portion of plate or sheet-metal. The thickness of the wall is preferably substantially constant from upstream of the inner recess to downstream of the inner recess.

In one embodiment of the disclosure, the inner shroud is formed from an annular plate (or sheet-metal) portion, and preferably having a constant thickness.

According to a preferred embodiment of the disclosure, a first of the orifices extends (at least) downstream of a leading edge of one of the vanes (of the straightener, opposite), and a second of the orifices extends (at least) upstream of that same leading edge.

Therefore, the first orifice can preferably be located between the cavity and the head of this vane (at certain instants during the rotation of the hub around the engine axis, bringing the first orifice opposite this vane head). Advantageously, this arrangement of at least two of the orifices allows a passive control of at least one portion of the air flow which constitutes the possible leakage vortices by its capture downstream at the level of the first orifice and its reinjection upstream via the second orifice, given that these two orifices are both in fluidic communication with the cavity, this portion of the air flow circulating in the cavity, between the two orifices.

It should be noted that the terminology "downstream", "upstream" refers to a position along the engine axis as the only reference frame. In particular, mathematically, a first point in the space is upstream (respectively, downstream) of a second point in the space if its component along the engine axis is smaller (respectively, larger) than that of the second point. Applying this same definition, a first assembly of points (corresponding abstractly to an orifice or a vane edge, in this case) "extends (at least) upstream" (respectively, "at least downstream") of a second assembly of points if it comprises at least one point that is upstream (respectively, downstream) of all the points of the second assembly of points. This definition is to be distinguished from the case where the first assembly of points extends "only (or totally, completely) upstream" (respectively, "only downstream") of the second assembly of points, corresponding to the fact that each of its points is upstream (respectively, downstream) of all the points of the second assembly of points. These formal clarifications are self-evident to the person skilled in the art, as the terminology "upstream" and "downstream" is widely used in the present technical field.

This relationship between the position of the first and second orifices and the leading edge of a vane is not limiting to the circumferential position of the orifices relative to the leading edge, especially as this circumferential position is likely to vary over time when the low-pressure compressor is in operation as the hub is rotating.

Preferably, according to the foregoing embodiment, a segment of the first orifice extends axially between respective radial projections on the inner shroud and/or the hub of the leading edge and a trailing edge of the vane. In particular, in this case, when the hub is rotating around the engine axis, the head of the vane in question necessarily passes opposite the first orifice and, therefore, the cavity, on each revolution of the hub. This allows the air flow of leakage vortices to be captured more effectively directly into the cavity through the first orifice as the clearance between the head of the vane and the rotor is typically minimal. In this way, this air flow is controlled and conveyed through the cavity to the second orifice, upstream of this leading edge, where it is reinjected into the main air flow of the low-pressure compressor. Preferably, the segment of the first orifice and the second orifice are at least partially axially aligned, in the sense that there is a line, preferably a plurality of lines, parallel to the engine axis intersecting the segment of the first orifice and the second orifice.

The inner shroud preferably extends an outer surface of the hub so as to (re)form an inner aerodynamic duct. Each of the aforementioned radial projections is preferably considered on an external surface of this duct. In particular, a vane edge is projected radially by an orthogonal projection of each point on this surface obtained by intersection between the latter and a line perpendicular to the engine axis passing through this point.

Preferably, in the above preferred embodiments, the inner shroud comprises a plurality of pairs of first and second orifices as described. This formulation does not exclude the case where a second orifice of one pair is a first orifice for another pair. An example of such a configuration is shown in FIG. 1 below. Preferably, the distribution of the orifices (and/or the first and second orifices) on the inner shroud is even.

Preferably, the orifices extend only upstream of a trailing edge of each vane. It is indeed advantageous to introduce orifices essentially axially opposite the vane heads and upstream of them to capture the air flow and reinject it upstream and/or at the inlet of the straightener into the main air flow of the low-pressure compressor.

In a preferred embodiment of the present disclosure, a collection of the orifices are substantially circumferentially aligned. Preferably, they each have a parallelogram-shaped profile extending axially at an angle of inclination of at most 60° with respect to the engine axis. Such orifices have the advantage of being easy to pierced (possibly regularly) one after the other in an inner shroud. As these orifices extend axially, they allow to bring an air flow of the leakage vortices from downstream towards upstream through their entire axial extent, not just at specific positions. The angle of inclination, in turn, allows the orifice to be oriented more or less circumferentially in accordance with the rotary movement of the rotor, preferably so that a vane head radially faces a plurality of such orifices communicating with the cavity, thus allowing a better control of the conveying of the flow of air from downstream towards upstream. This shape of the orifices of the collection contributes to increasing the overall aerodynamic performance of the aircraft turbine engine and decreasing its fuel consumption.

It should be noted that the fact that the orifices in the collection all have a parallelogram profile does not strictly limit the shape of the parallelogram for each orifice. In particular, the collection optionally comprises such orifices extending more axially and/or circumferentially than others, and/or having potentially different angles of inclination. However, it is preferred that all orifices in the collection have a profile corresponding to a single parallelogram.

Preferably, each of the orifices of the collection extends upstream and downstream of a leading edge of each vane. In this way, each orifice allows both a capture of air flow downstream of the leading edges of the vanes and a reinjection of this air flow upstream of these leading edges. More preferably, each orifice in the collection comprises:
  an upstream end, located upstream of the leading edge, at an axial distance from the latter of at most 25%, preferably between 10 and 25%, of a chord of each vane;
  a downstream end, located downstream of the leading edge, at an axial distance from the latter of at most 75%, preferably between 10 and 75%, of the chord of each vane.

It is recalled that the term "axial distance" refers to a distance measured along the engine axis. In particular, the axial distance between two points in the space is the absolute value of the difference of their component along the engine axis. Such an (axial) distance between two assemblies of points is generally recognized as the smallest of the (axial) distances between a point in one of these assemblies and a point in the other of these assemblies. The "chord" of a vane is a measurement of the extension of this vane along the engine axis, this measurement being preferably performed at the level of the head of the vane. The term "chord of a vane" is common to a person skilled in the art and generically refers to an "axial length" of the vane, the latter term generically referring to a length measured along the engine axis.

The values of up to 25% and 75%, and their associated preferred values, indicate that the orifices are configured to extend axially, sufficiently upstream to reinject the air flow strictly upstream of the straightener, and sufficiently downstream (while remaining upstream of the trailing edge of the vanes) to capture this air flow effectively along the clearances between the vane heads and the inner shroud and/or the hub.

In this spirit, and preferably according to these latter embodiments, an axial length of each orifice of the collection is between 10 and 75% of a chord of each vane.

According to a preferred embodiment of the present disclosure, compatible with the preceding preferred embodiments, the orifices comprise two circumferentially aligned groups of orifices, the groups being at an axial distance from each other of between 10 and 50% of a chord of each vane. It is thus possible to capture the air flow specifically with the orifices of one of these groups, at a selected downstream position of the leading edges of the vanes, and to reinject it at an upstream position, preferably upstream of these leading edges, through the orifices of the other of these groups. The air flow is thus conveyed between the orifices of these groups through the cavity, without disturbing the air flow over the axial distance separating these two groups. The points of capture and reinjection of the air flow can also be chosen more precisely, away from the above-mentioned axial distance also chosen.

According to a particular embodiment, one of the groups corresponds to the above collection according to previous embodiments, and the orifices of the other of the groups each have another parallelogram-shaped profile. Preferably, the orifices of the other group extend axially with a further angle of inclination of at most 60° to the engine axis.

According to a preferred embodiment of the present disclosure, the orifices occupy more than a half of a (cylindrical) surface of the inner shroud which extends axially between an overall upstream end and an overall downstream end of all the orifices. In other words, the inner shroud comprises more surface area of orifices than material, between the above-mentioned overall ends.

According to a particular embodiment of the disclosure, the cavity is partitioned into a plurality of cells stationary with respect to the vanes, and bounded by edges, each cell extending both axially and circumferentially, along an axially inclined direction, so that it comprises:

a downstream segment radially facing a space separating first and second of the circumferentially aligned vanes;
an upstream segment radially facing another space separating third and fourth of the circumferentially aligned vanes, at least one of the third and the fourth vanes being distinct from both the first and second vanes.

This statement applies at any time, even during the rotation of the hub, so that there are always such downstream and upstream segments opposite distinct spaces between two successively aligned vanes at each such time. In this way, air flow captured downstream at the axial level of a vane and/or a space between two vanes is reinjected upstream of another vane and/or another space between two vanes. This allows to improve the performance of the compressor by limiting the disturbances that could be caused by an oversized cavity. In a particular embodiment of the cells, the fourth vane corresponds to the first vane, so that the third, first and second vanes, in that order, are successively aligned circumferentially. This particular embodiment of the cells advantageously allows the air flow of leakage vortices to be captured at the level of the intrados of a vane, in this case the first vane, and this air flow to be extracted from the extrados of this same vane. This facilitates the reinjection of this air flow into the primary air flow. The edges of the cells may be bevelled in order to optimize the flowing of the air flow within each cell. Preferably, each orifice is in fluidic communication with a single cell.

In a general embodiment of the present disclosure, edges of the orifices are bevelled so as to have a flared profile. Such a profile is preferably flared outwardly downstream of the leading edges of the vanes to facilitate the capture of an air flow, and flared inwardly upstream of the leading edges of the vanes to facilitate the reinjection of the air flow upstream of the straightener.

Generally and preferably, the sub-assembly according to this disclosure comprises an outer (and stationary) casing. Each of the vanes of the straightener comprises a root attached to the outer casing, and extends substantially radially inwards from its root towards its free head.

The present disclosure also proposes a low-pressure compressor stage comprising the sub-assembly according to the disclosure. In this case, the rotor is preferably equipped with movable vanes, each of which comprises a root attached to the hub and extends substantially radially outwards from this root. The disclosure also proposes a low-pressure compressor for an aircraft turbine engine comprising a stage and/or a sub-assembly according to the present disclosure. The preferred embodiments and advantages of the sub-assembly according to the disclosure are mutatis mutandis applicable to the present stage of low-pressure compressor and low-pressure compressor.

Finally, the disclosure proposes an aircraft turbine engine equipped with a low-pressure compressor according to the disclosure. The preferred embodiments and the advantages of the low-pressure compressor according to the disclosure apply mutatis mutandis to the present aircraft turbine engine.

The use of the verb "to comprise" and its variants, as well as its conjugations in this document, cannot in any way exclude the presence of elements other than those mentioned. The use in this document of the indefinite article "a", or the definite article "the", to introduce an element does not exclude the presence of a plurality of such elements. The terms "first", "second", "third", and so on are used in the scope of this document exclusively to differentiate between similar elements, without implying any order between these elements.

It is recalled that the present disclosure relates to the technical field of the compressors (and, in particular, that of low-pressure compressors) for aircraft turbine engines. This is a very special technical field with specific technical constraints for the compressors. In particular, this technical field should not be confused and/or amalgamated with the separate field of the turbines for an aircraft turbine engine. In particular, it is recalled that the purpose of a compressor is to compress air entering the aircraft turbine engine at the inlet, whereas that of a turbine is to expand a gas at the outlet of the combustion chamber of the aircraft turbine engine. In particular, the roles, positions and technical constraints (e.g. the rotational speeds, the temperatures, the exposure to external debris, etc.) associated with the operation of a compressor and a turbine for an aircraft turbine engine are in particular completely different. A person skilled in the art interested in the technical field of the aircraft turbine engine compressors, and a fortiori in the very particular technical context of the present disclosure introduced in the prior art, would not consult and be inspired by a document of the prior art relating to the turbines for aircraft turbine engines to develop an disclosure relating to the compressors without it being clear from this prior art how to take into account the numerous technical differences between these technical fields.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
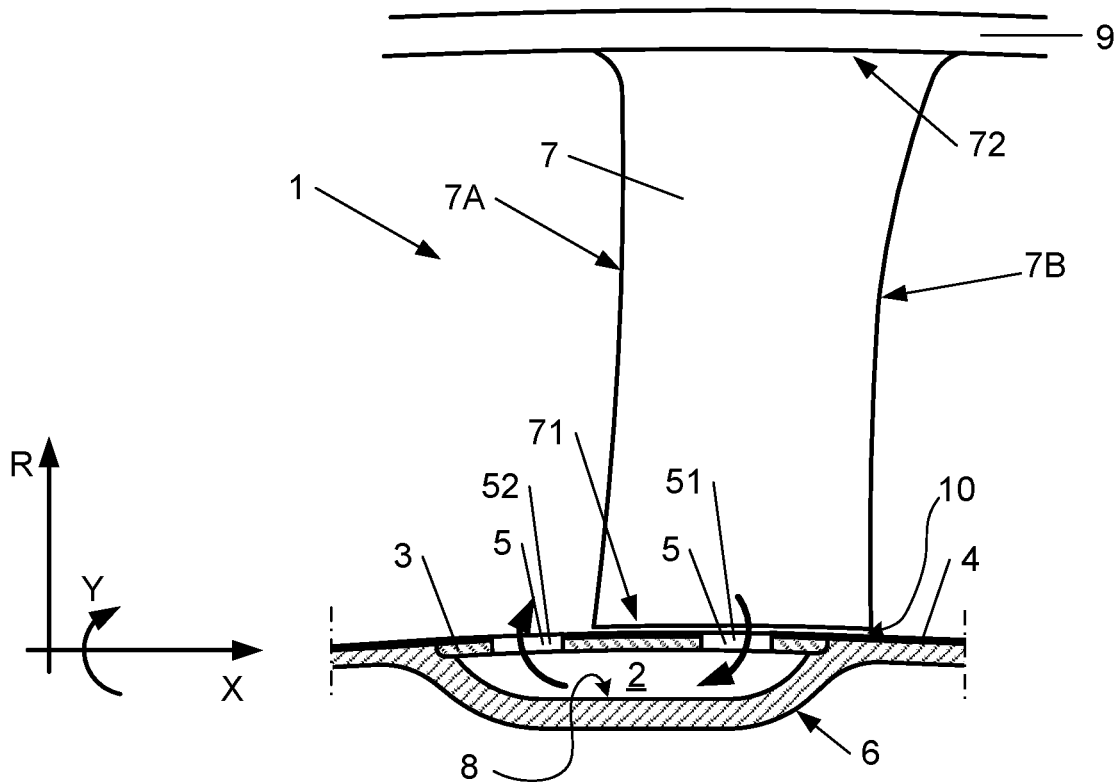
FIG. 1 illustrates a partial schematic view of a cross-section of a low-pressure compressor sub-assembly according to one embodiment of the disclosure.

The drawings in the figures are not to scale. Generally, similar elements are denoted by similar references in the figures. In the scope of this document, the same or similar elements may have the same references. Furthermore, the presence of reference numbers or letters in the drawings cannot be considered as limiting, even when these numbers or letters are indicated in the claims.

DETAILED DESCRIPTION

While illustrative embodiments have been illustrated and described, it will be appreciated that various changes can be made therein without departing from the spirit and scope of the invention.

References are shown in some of these figures as abstract geometrical reference frames primarily to quantify and/or visualize properties of embodiments of the disclosure. In the context of this document, reference is made to the "axial", "circumferential" and "radial" directions corresponding respectively to directions parallel to the engine axis, essentially circular around the engine axis, and perpendicular to the engine axis. Reference frames on the figures show these directions (equipped with an orientation) marked as X, R and Y respectively. By abuse of notation for similar elements, as the corresponding vector X has the same orientation and the same direction as the engine axis, the latter will also be referred to as X. The terms "axially", "radially" and "circumferentially" are derived from the terms "axial", "radial" and "circumferential" respectively, with a similar preferred meaning. The terms "circumferential" and "radial" furthermore preferentially refer to a polar coordinate system known to a person skilled in the art in each plane perpendicular to the engine axis. The terms "inward" and "inwardly" naturally correspond to an orientation towards the engine axis X in a radial direction, and the terms "outward" and "outwardly" to the opposite orientation in that direction.

Figure 5:
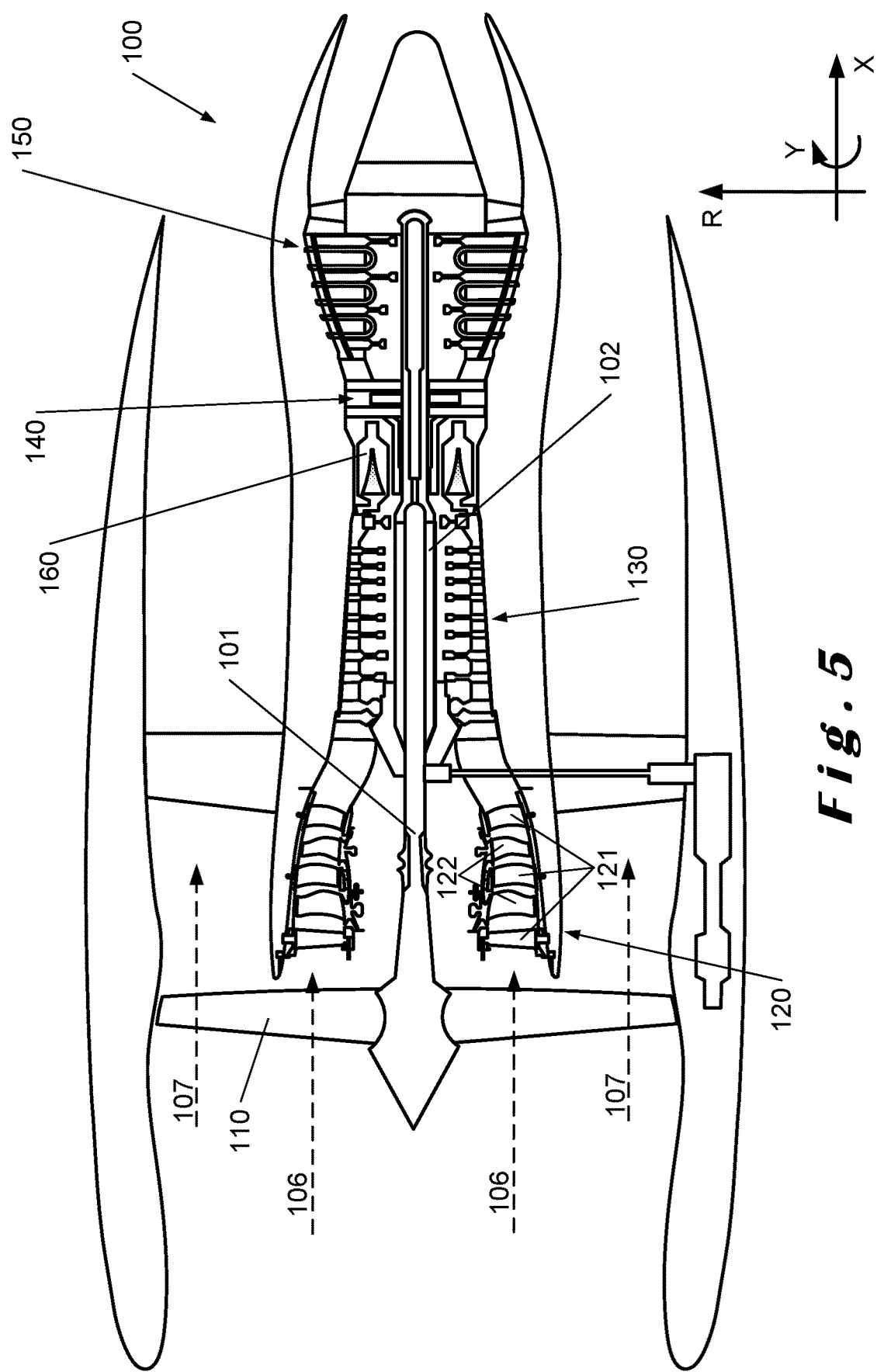
FIG. 5 shows a simplified schematic cross-section of an aircraft turbine engine according to one embodiment of the disclosure.

FIG. 5 illustrates an axial double-flow aircraft turbine engine 100 comprising in succession along the engine axis X, a fan 110, a low-pressure compressor 120, a high-pressure compressor 130, a combustion chamber 160, a high-pressure turbine 140 and a low-pressure turbine 150. These elements are known to a person skilled in the art. In operation, the mechanical power of the low 150 and high 140 pressure turbines is transmitted via low 101 and high 102 pressure shafts respectively to the low 120 and high 130 pressure compressors, as well as to the fan 110 via the low pressure shaft 101. As is known, the fan 110 allows to generate a primary air flow 106 passing through the aircraft turbine engine 100 in a primary air flow duct and a secondary air flow 107 outwardly around the compressors 120, 130 and turbines 140, 150.

The low-pressure compressor 120 comprises alternating along the engine axis X of movable bladings 122 about the engine axis X, and straighteners 121 consisting of stationary bladings. FIG. 1 shows a cross-section of a sub-assembly 1 of a low-pressure compressor 120 according to a preferred embodiment of the disclosure. This sub-assembly 1 comprises one of the above straighteners 121. This comprises circumferentially aligned stationary overhang vanes 7 of similar profile. Each vane 7 comprises a root 72 attached to an outer casing 9 of the low-pressure compressor 120, and a free head 71 (i.e., not attached to any other element) opposite this root 72 along a radial direction of extension of the vane 7. In particular, the vane 7 extends essentially radially inwards. The vane 7 also comprises a leading edge 7A and a trailing edge 7B which are oriented mainly upstream and downstream. The straightener 121 allows the flowing of the primary air flow 106 to be brought back parallel to the engine axis X, and at the same time to increase its pressure and decrease its absolute speed.

The sub-assembly 1 also comprises a rotor portion (or rotor) comprising a hub 6 extending circumferentially about the engine axis X and rotating about it. The rotor portion generally comprises movable vanes extending essentially radially outwards, towards the outer casing 9, from a root attached to the hub 6. The stationary blading forming the straightener 121 and the movable blading of the rotor are then assembled next to each other along the engine axis X.

In general, the free heads 71 of the overhang vanes 7 radially face (or similarly face) the hub 6, but do not touch it as the vanes 7 are stationary and the hub 6 is rotating. Thus, there is only a small clearance (or space) 10 between the free heads 71 of vanes 7 and the hub 6. This clearance leads to the generation and the circulation of air flows from leakage vortices from downstream towards upstream, which results in a loss of efficiency of the low-pressure compressor 120. To reduce this effect, the present disclosure proposes to treat the hub 6 so as to create in it at least one inner recess (i.e., an inward recess) 8 at least radially opposite a passage position of the free heads 71 of vanes 7.

It is also proposed that an inner shroud 3 be added to the rotor portion to cover this lower recess 8, so as to extend the outer surface of the hub 6 without a recess and to restore an inner aerodynamic duct 4 originally present before the hub 6 was treated. In this way, the clearance 10 between the inner aerodynamic duct 4 and the free heads 71 of vanes 7 is essentially maintained. The inner shroud 3 is attached to the hub 6, preferably by welding. This operation also allows to define a cavity 2 bordered axially and radially inwards by the inner recess 8 of the hub 6 and radially outwards by the inner shroud 3. The cavity 2 preferably has a depth, taken in a radial direction, in the range between 5% of the radial length of the vane 7 and 20% of the radial length of the vane 7. The cavity 2 preferably has a length, taken in an axial direction, in the range between 50% of the axial width of the vane 7 and 150% of the axial width of the vane 7.

The inner shroud 3 comprises orifices 5 in communication with the cavity 2. At least one orifice is in communication with the clearance 10. Each free head 71 faces the inner aerodynamic duct 4, and more precisely, at least partially the inner shroud 3 and/or the cavity 2, as well as optionally partially the hub 6. The orifices 5 are arranged so that the free heads 71 of vanes 7 face the first orifices 51 (or orifice segments) and downstream of the second orifices 52 (or other orifices segments) when the hub 6 rotates, on a regular and/or periodic manner. Air flow from the leakage vortices (which is represented by arrows in FIG. 1) can thus be captured through these first orifices 51, conveyed downstream towards upstream within the cavity 2 and reinjected upstream through these second orifices 52.

Figure 2:
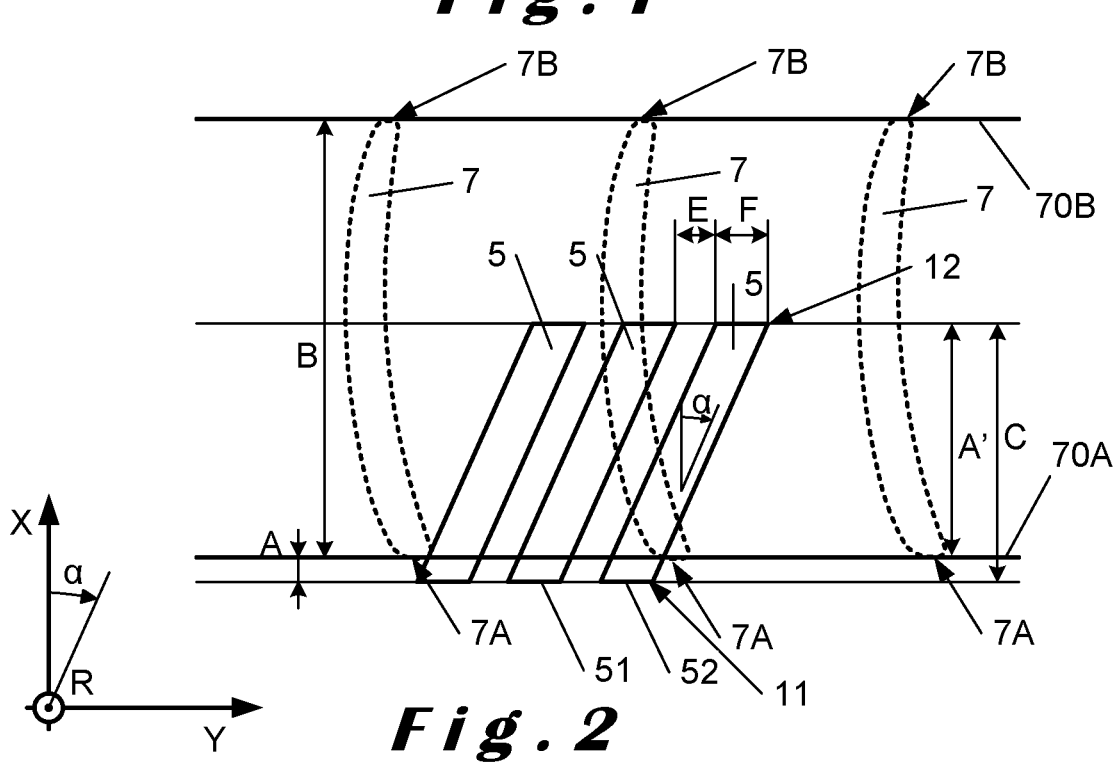
FIGS. 2 and 3 illustrate schematic views of local orifices and straightener vanes arrangements with profiles projected onto an inner aerodynamic duct of the low-pressure compressor according to embodiments of the disclosure.
Figure 3:
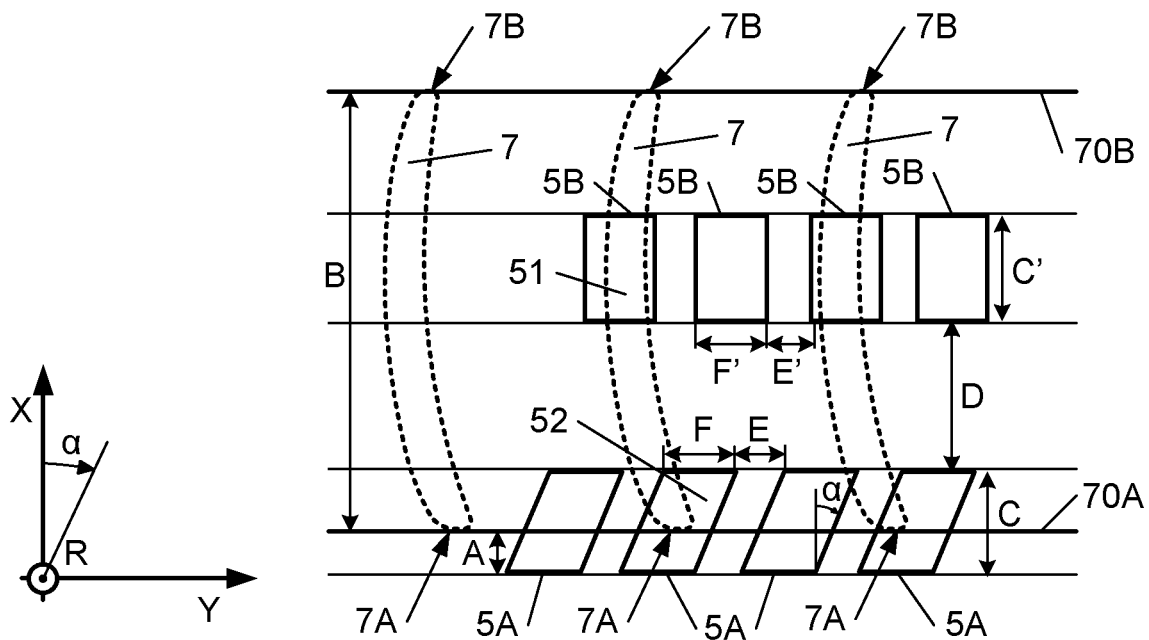

FIGS. 2 and 3 each illustrate an inner aerodynamic duct 4 (shown as circumferentially unrolled and spread out in one plane) onto which profiles of the vanes 7 are radially projected and which comprise the orifices 5. The references introduced for the vanes apply in a similar way. The leading edges 7A and the trailing edges 7B of the vanes 7 are on the lines 70A and 70B respectively.

The orifices 5 comprise a collection (or first group 5A) of orifices 5 that extend both axially along an axial length C and circumferentially, and all have a parallelogram-shaped profile with a preferred angle of inclination a of between 0 and 60°, preferably between 30 and 45°, with respect to the engine axis X. Along a circumference of the inner aerodynamic duct 4, the orifices have a constant circumferential width F and are separated by a circumferential space E, preferably smaller than the circumferential width F. Each of these orifices 5 comprises both an upstream end 11 at an axial distance A from the line 70A comprise between 5 and 15% of a chord B of the vanes 7, and a downstream end 12 at an axial distance A':=C−A from the line 70A of preferably between 10 and 75% of the chord B of the vanes 7. In particular, all the orifices 5 are only upstream of the trailing edges 7B of the vanes 7, since it is precisely at the axial level of the free heads 71 of vanes that air flow from leakage vortices must be captured and brought upstream of the leading edges 7A of the vanes 7. These parallelogram-shaped orifices 5 have the advantage of being very easy to design and effective in achieving the technical effect intended by the present disclosure.

In the case of FIG. 2, the orifices 5 extend axially over a large axial length C, preferably between 60 and 80% of the chord B of the vanes 7. These orifices 5 thus extend continuously from their downstream end 12, between the leading 7A and trailing 7B edges of the vanes 7, to their upstream end 11, upstream of the leading edge 7A of the vanes 7, allowing to capture the air flow over their entire length in order to bring it via the cavity 2 from downstream to upstream and to reinject it upstream of the straightener 121 into the primary air flow. The angle of inclination a means that, simultaneously, a downstream segment of a first orifice 51 extends opposite a vane 7, between its leading 7A and trailing 7B edges, while an upstream segment of a second orifice 52 extends upstream (and downstream) of the leading edge 7A of this same vane 7, these two segments being at least partially axially aligned, in the sense that there is a straight line, preferably a plurality of straight lines, parallel to the engine axis X which intersects them.

In the case of FIG. 3, the orifices 5 extend axially over a shorter axial length C, preferably between 10 and 40% of the chord B of the vanes 7. They are coupled through the cavity 2 to a second group 5B of orifices 5, the second group 5B is downstream of the first 5A at an axial distance D preferably comprised between 10 and 50% of the chord B of the vanes 7. The orifices 5 of the second group 5B have a geometric profile independent of those of the first group 5A (corresponding to parallelograms of zero angle of inclination in the case of FIG. 3, i.e., rectangles). They extend axially over an axial length C', preferably comprised between 10 and 40% of the chord B of the vanes 7, and have a circumferential width F preferably greater than a circumferential space E' separating them in pairs. The orifices 5 of the second group 5B are mainly dedicated to capture the air flow of leakage vortices between the leading 7A and trailing 7B edges of the vanes 7, while the orifices 5 of the first group 5A are more dedicated to reinject in a controlled way this air flow upstream of the straightener 121. In particular, preferably, at least one segment of a first orifice 51 of the second group 5B extends opposite a vane 7, between its leading 7A and trailing 7B edges, while at least one segment of a second orifice 52 of the first group 5A extends upstream (and downstream) of the leading edge 7A of this same vane 7, these two segments being at least partially axially aligned in the above-mentioned sense.

Figure 4A:
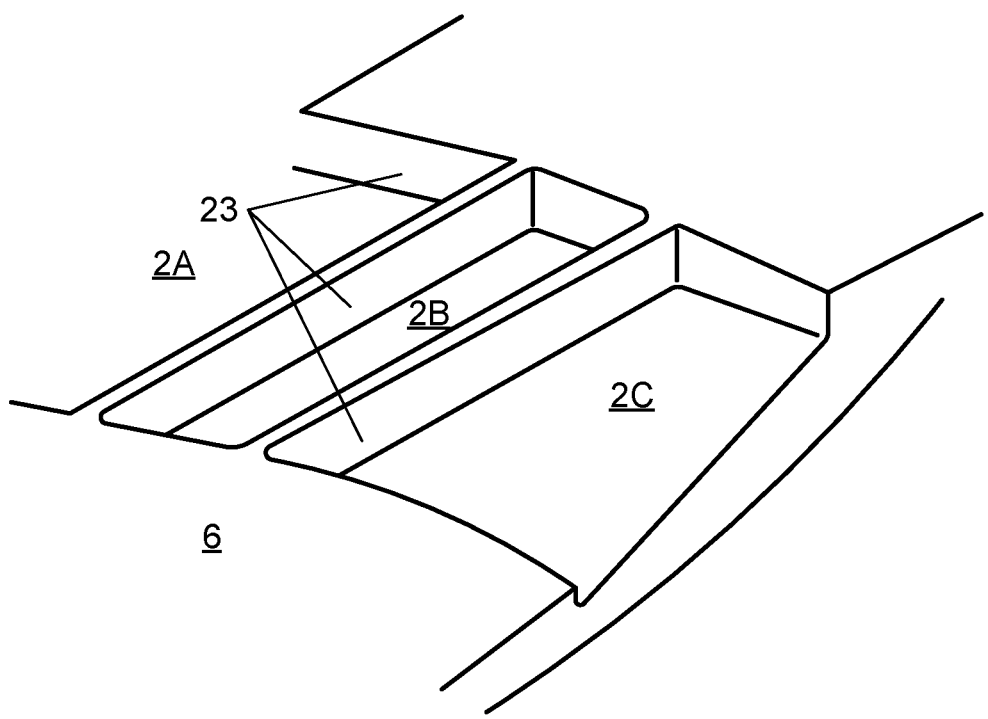
FIGS. 4A and 4B illustrate schematic and partial three-dimensional and two-dimensional projected views, respectively, of a cavity partitioned into cells in a rotor hub according to an embodiment of the disclosure.
Figure 4B:
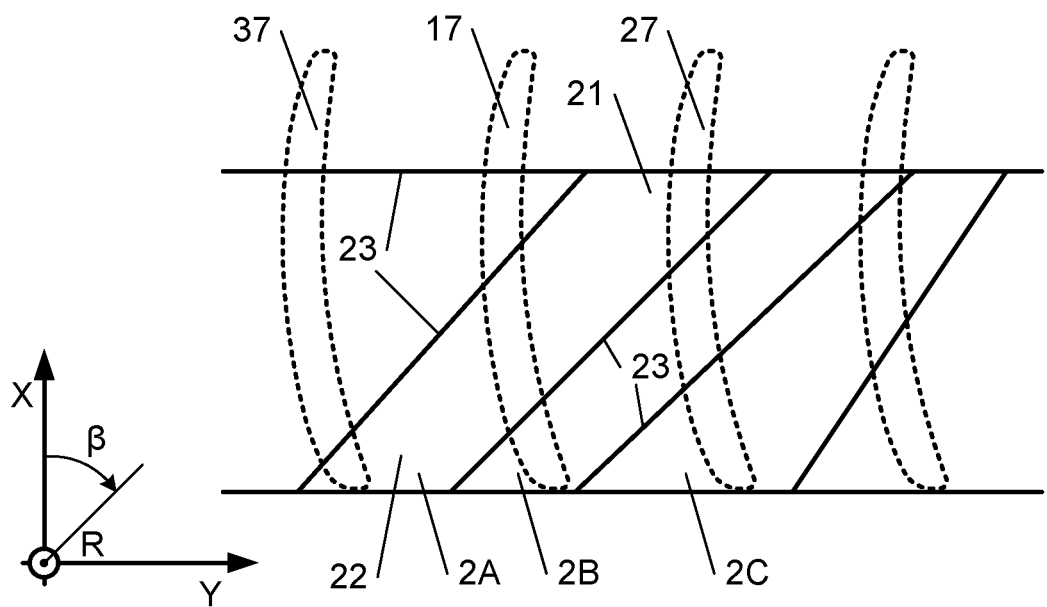

According to a preferred embodiment of the disclosure illustrated in FIGS. 4A and 4B, the cavity 2 is partitioned into cells 2A, 2B, 2C bounded by edges 23 typically formed in the hub 6. Each such cell 2A, 2B, 2C extends axially at least partially radially opposite the vanes 7 and circumferentially at a main angle β preferably between 10 and 60°, so that an upstream segment 22 of each such cell 2A is radially opposite a space between a third (37) and a first (17) of the vanes 7, whereas a downstream segment 21 of this cell 2A is radially opposite a space between the first vane (17) and a second vane (27) distinct from the preceding ones. In this way, air flow from the leakage vortices is brought from downstream to upstream in a cell 2A, from a space between two vanes 7 of one successive pair of vanes 7, into another space between two vanes 7 of another successive pair of vanes 7. The cells 2A, 2B, 2C can for example be carried out by embossing the wall of the hub 8.

In summary, the present disclosure relates to a sub-assembly 1 of low-pressure compressor 120 for an aircraft turbine engine 100 comprising a straightener 121 equipped with overhang vanes 7 and a rotor hub 6 comprising a cavity 2 covered by an inner shroud 3 facing the vanes 7, orifices 5 being fitted in this inner shroud 3 to allow the circulation of an air flow from downstream to upstream of the low-pressure compressor 120.

The present disclosure has been described above in connection with specific embodiments, which are illustrative and should not be considered limiting. In general, it will be apparent to a person skilled in the art that the present disclosure is not limited to the examples illustrated and/or described above.

The embodiments of the invention in which an exclusive property or privilege is claimed are defined as follows:

1. A sub-assembly for a low-pressure compressor of an aircraft turbine engine extending along an engine axis (X) directed from upstream towards downstream, the sub-assembly comprising:
 a rotor comprising a hub extending axially and circumferentially around the engine axis (X); and
 a stator comprising a straightener equipped with vanes extending radially towards the hub;
 wherein:
 the hub comprises an inner recess directed towards the engine axis (X); and
 the rotor comprises an inner shroud:
  covering the inner recess so as to define a cavity between the hub and the inner shroud,
  each of the vanes comprising a free head facing at least partially the inner shroud and/or the cavity;

comprising orifices in fluidic communication with the cavity, and wherein the inner shroud is formed of an annular plate portion,
wherein the cavity is partitioned into cells bounded by edges, each cell extending both axially and circumferentially, in an axially inclined direction, so that each cell comprises:
a downstream segment radially facing a space between first and second of the vanes which are successively circumferentially aligned;
an upstream segment radially facing another space between third and fourth of the vanes which are successively circumferentially aligned, at least one of the third and the fourth vanes being distinct from both the first and second vanes, the fourth vane corresponding to the first vane, so that the third, first and second vanes, in that order, are successively aligned circumferentially.

2. The sub-assembly according to claim 1, wherein a first of the orifices extends at least downstream of a leading edge of one of the vanes, and in that a second of the orifices extends at least upstream of said leading edge.

3. The sub-assembly according to claim 2, wherein at least one segment of the first of the orifices extends axially between respective radial projections on the inner shroud and/or the hub of the leading edge and a trailing edge of the one of the vanes, the segment of the first of the orifices and the second of the orifices being preferentially at least partially axially aligned.

4. The sub-assembly according to claim 2, wherein the inner shroud comprises a plurality of pairs of such first and second orifices.

5. The sub-assembly according to claim 1, wherein a collection of said orifices are circumferentially aligned and each have a parallelogram-shaped profile extending axially with an angle of inclination ($\alpha$) of at most 60° with respect to the engine axis (X).

6. The sub-assembly according to claim 5, wherein each of the orifices of the collection extends upstream and downstream of a leading edge of each vane.

7. The sub-assembly according to claim 6, wherein each of the orifices of the collection comprises:
an upstream end, located upstream of said leading edge, at an axial distance (A) therefrom of at most 25% of a chord (B) of each vane;
a downstream end, located downstream of said leading edge, at an axial distance (A') therefrom of at most 75% of the chord (B) of each vane.

8. The sub-assembly according to claim 5, wherein an axial length (C) of each orifice of the collection is between 10 and 75% of a chord (B) of each vane.

9. The sub-assembly according to claim 8, wherein the orifices comprise two circumferentially aligned groups of orifices, the groups being at an axial distance (D) from each other of between 10 and 50% of a chord (B) of each vane, and in that one of the groups corresponds to the collection and in that the orifices of the other of the groups each have a further parallelogram-shaped profile.

10. The sub-assembly according to claim 1, wherein the orifices comprise two circumferentially aligned groups of orifices, the groups being at an axial distance (D) from each other of between 10 and 50% of a chord (B) of each vane.

11. The sub-assembly according to claim 1, wherein edges of the orifices are bevelled, so as to have a flared profile.

12. The sub-assembly according to claim 1, wherein the inner recess is formed by at least one deformation of a wall of the hub.

13. A low-pressure compressor for an aircraft turbine engine, comprising a sub-assembly according to claim 1.

14. An aircraft turbine engine, equipped with a low-pressure compressor according to claim 13.

* * * * *